No. 720,989. PATENTED FEB. 17, 1903.
C. WILLIAMS.
PROCESS OF MAKING ELBOWS.
APPLICATION FILED JUNE 19, 1901.
NO MODEL.

WITNESSES
INVENTOR
Charles Williams
by Bakewell & Byrnes
his attys.

UNITED STATES PATENT OFFICE.

CHARLES WILLIAMS, OF LANDORE, ENGLAND, ASSIGNOR TO THE BRITISH MANNESMANN TUBE CO., LIMITED, OF LANDORE, ENGLAND.

PROCESS OF MAKING ELBOWS.

SPECIFICATION forming part of Letters Patent No. 720,989, dated February 17, 1903.

Application filed June 19, 1901. Serial No. 65,104. (No model.)

*To all whom it may concern:*

Be it known that I, CHARLES WILLIAMS, foreman blacksmith, a subject of the King of Great Britain, residing at Landore, R. S. O., England, have invented certain new and useful Improvements in the Process of Making Elbows, &c., (for which I have applied for a patent in Great Britain, No. 7,472, dated April 11, 1901, and in France, dated May 4, 1901,) of which the following is a specification.

This invention relates to a process for the manufacture of elbows from pieces of jointless tubes, as I shall describe, referring to the accompanying drawings.

Figure 1:
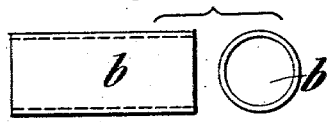
Figure 2:
Figure 3:
Figure 4:
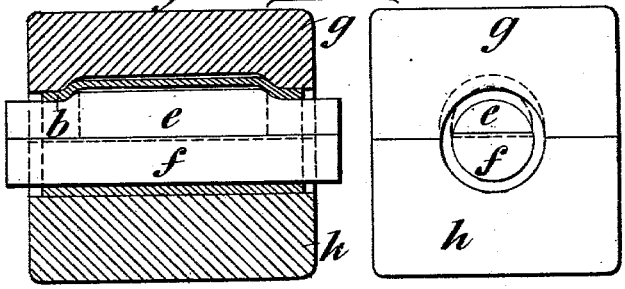
Figures 5, 6:
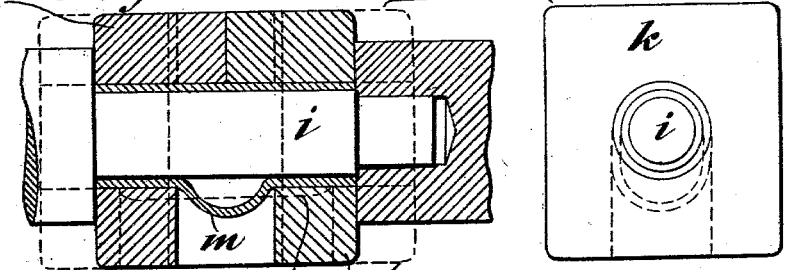
Figure 7:
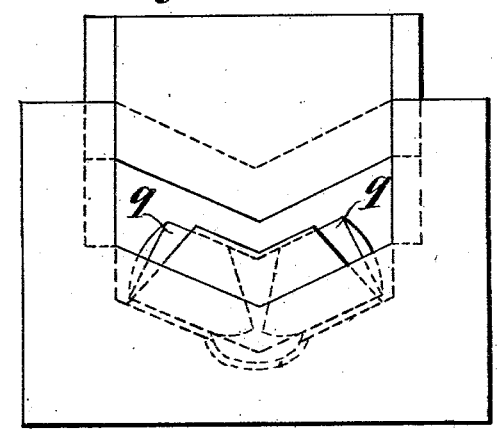
Figure 8:
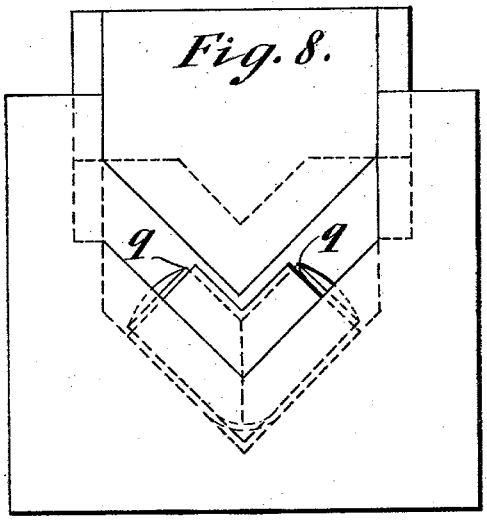

Figures 1 to 3, inclusive, show stages in preparing the blank for making an elbow according to my invention. Figs. 4 and 5 are longitudinal sections of tools for preparing the blank. Fig. 6 is an elevation of the blank with mandrels introduced into it, and Figs. 7 and 8 are elevations of tools for completing the elbow.

The blank is prepared in any convenient manner so as to have a rounded bulge $m$ in its middle part. This step of the process forms no part of my invention; but one mode of effecting this is the following:

The blank $b$, Fig. 1, having a larger diameter than the branches of the finished elbow, is put, as shown in Fig. 4, on a mandrel made in halves $e\,f$ and placed between a pair of dies $g\,h$, which are pressed together, so as to reduce the diameter of the ends of the blank, bringing it to the shape shown in Fig. 2. By first removing endwise the part $f$ of the mandrel the part $e$ can be taken out of the blank. The blank is next put on a mandrel $i$ of the same diameter as the branches of the finished elbow and placed between a pair of transversely-divided dies $j\,k$, as shown in Fig. 5, each having a semicircular hollow in its lower side. On pressing these dies toward each other the projecting part of the metal of the blank is displaced and caused to form the rounded bulge $m$. Any other suitable process of forming the bulge $m$ may be employed.

The ends of the blank may be cut off obliquely, as shown in Fig. 6; but this need not be done until the ends of the elbow are trimmed after its formation is completed.

Two short mandrels $q$, each having its end suitably inclined, are introduced into the blank, in which they are placed symmetrically with their pointed ends nearly meeting over the bulge $m$. The blank is then bent between dies. This bending may be effected by pressing the blank between one pair of dies, but preferably between successive dies. (Shown in Figs. 7 and 8.) By thus bending a blank made with a bulge on one side an elbow is manufactured, all the metal of which has its full strength.

Having thus described the nature of this invention and the best means I know of carrying the same into practical effect, I claim—

The process of manufacturing elbows from jointless tubing, which consists in forming a bulge on one side of the tube, then bending said tube in the opposite direction to elbow shape, and at the same time internally supporting the blank as set forth; substantially as described.

In testimony whereof I have hereunto set my hand in presence of two subscribing witnesses.

CHARLES WILLIAMS.

Witnesses:
HENRY ROBINSON,
WM. R. DOWNALL.